United States Patent Office 3,557,080
Patented Jan. 19, 1971

3,557,080
MONOAZO DYES CONTAINING 2-PHENYL-INDOLES
Johannes Dehnert and Gerhard Gnad, Ludwigshafen (Rhine), Germany, assignors to Badische Anilin- & Soda-Fabrik Aktiengesellschaft, Ludwigshafen (Rhine), Germany
No Drawing. Filed July 19, 1968, Ser. No. 746,005
Claims priority, application Germany, July 27, 1967, 1,644,063
Int. Cl. C09b 29/36
U.S. Cl. 260—165    2 Claims

ABSTRACT OF THE DISCLOSURE

Dyes devoid of sulfonic acid groups and derived from nitroanthranilic acid esters and 2-phenylindoles, especially useful for dyeing synthetic polyesters and polyamides.

This invention relates to monoazo dyes devoid of sulfonic acid groups and having the general Formula I:

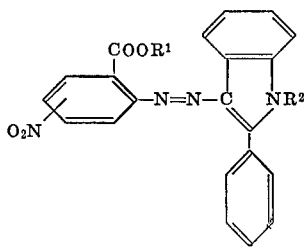

(I)

in which $R^1$ denotes an unsubstituted or substituted aliphatic, cycloaliphatic or araliphatic radical and $R^2$ denotes a hydrogen atom or an unsubstituted or substituted alkyl radical.

$R^1$ as a radical of the alcohol component of the ester having the Formula I may be derived for example from the following compounds containing hydroxyl groups, only one hydroxyl group being esterified with the dye radical in the case of polyfunctional alcohols: methanol, ethanol, 1-propanol, 2-propanol, 1-butanol, 2-butanol, tertiary-butanol, allyl alcohol, cyclohexanol, benzyl alcohol, 1-phenylethanol, 2-phenylethanol, glycol, glycol monomethyl ether, glycol monoethyl ether, glycol 1-butyl ether, glycol phenyl ether, diglycol, thiodiglycol, methyldiglycol, 1,6-hexanediol, glycol monoacetate, glycol monopropionate, glycol monobenzoate, 2-hydroxypropionitrile and 2-hydroxypropionamide.

In addition to a hydrogen atom, examples of radicals $R^2$ are methyl, ethyl, cyanoethyl, carboxyethyl, carboalkoxyethyl and carbamoylethyl.

Dyes which are preferred industrially are those which have the general Formula Ia or Ib:

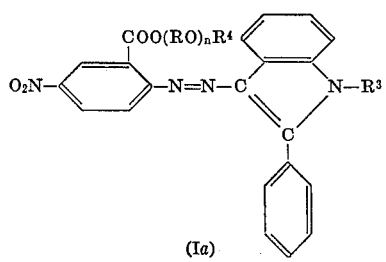

(Ia)

or

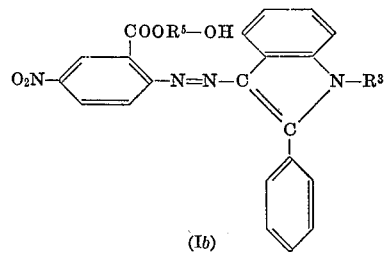

(Ib)

in which R denotes a linear or branched alkylene radical having two or three carbon atoms, $R^4$ denotes a hydrogen atom or a linear or branched alkyl radical having one to four carbon atoms or an acetyl group or propionyl group, $R^5$ denotes a linear or branched alkylene radical having four to ten carbon atoms, $n$ denotes one of the integers from 1 to 6 and $R^3$ denotes a hydrogen atom or a methyl or cyanoethyl group.

Among the dyes having these formulae, those are particularly valuable in which the carboxyl group is esterified with an alkyl glycol or alkyl polyglycol having three to ten carbon atoms.

The new dyes having the Formula I may be obtained by coupling diazo compounds of amines having the general Formula II:

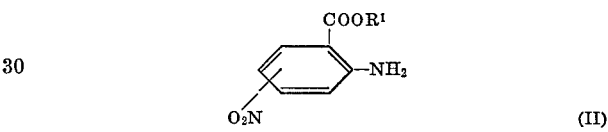

(II)

with indoles which are devoid of sulfonic acid groups, couple in 3-position and have the general Formula III:

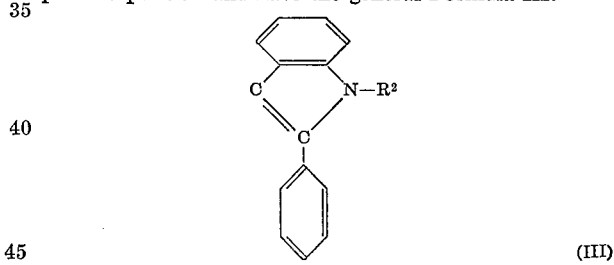

(III)

in which $R^1$ and $R^2$ have the above meanings.

Diazotization is carried out in aqueous hydrochloric acid alone or with the addition of dispersing agents, depending on the solubility of the diazo components. The addition of organic solvents such as alcohols, glacial acetic acid, acetone or dimethylformamide may be advantageous. In the latter case it is appropriate first to dissolve the diazo components in the organic solvent and then to add the acid. Diazotization may also be carried out in concentrated sulfuric acid.

The coupling components are dissolved in organic solvents such as dimethyl formamide or N-methylpyrrolidone or used in finely divided form as aqueous suspensions for reaction with the diazo components. They may also be dissolved in sulfuric acid. Sometimes the addition of an acid-binding agent, for example sodium acetate, sodium bicarbonate, sodium carbonate and caustic soda solution may be advantageous.

The new dyes are suitable for dyeing synthetic fibrous material, particularly of polyamides and polyesters. They may be used singly or mixed together. The dyeings obtained with them are distinguished by excellent fastness to light and heat setting.

The invention is illustrated by the following examples, in which parts and percentages are by weight unless stated otherwise.

EXAMPLE 1

30 parts by volume of 23% aqueous sodium nitrite solution is allowed to flow slowly while stirring at 3° to 8° C. into a suspension of 19.6 parts of 2-amino-5-nitro-benzoic methyl ester in 300 parts by volume of glacial acetic acid and 25 parts by volume of concentrated hydrochloric acid. A small amount of ice is added during the addition of the nitrite solution. The whole is then stirred for another two hours at 0° to 5° C., any excess of nitrite present is destroyed and the pH value is adjusted to 4 by adding aqueous sodium acetate solution. The solution is filtered and added in small portions to a solution of 20.3 parts of 2-phenylindole in 600 parts by volume of dimethyl formamide.

During coupling, the temperature is kept at 0° to 5° C. by external cooling and the gradual addition of about 300 parts of ice. The deposited dye is then suction filtered, washed with water and dried at 70° C. A red brown powder is obtained which dissolves in acetone with an orange color and in finely divided form gives an orange dyeing having very good fastness properties on polyethylene terephthalate cloth.

The dyes in the following table are obtained in an analogous manner:

| Example Number: | Structure | Shade of dyeing on polyethylene terephthalate |
|---|---|---|
| 2 | $O_2N-\phenyl(COOC_2H_5)-N=N-$ indole(2-phenyl) | Orange. |
| 3 | $O_2N-\phenyl(COOC_3H_7(n))-N=N-$ indole(2-phenyl) | Do. |
| 4 | $O_2N-\phenyl(COOC_3H_7(i))-N=N-$ indole(2-phenyl) | Do. |
| 5 | $O_2N-\phenyl(COOC_4H_9(i))-N=N-$ indole(2-phenyl) | Do. |
| 6 | $O_2N-\phenyl(COO(CH_2)_2O(CH_2)_2O(CH_2)_2OH)-N=N-$ indole(2-phenyl) | Do. |
| 7 | $O_2N-\phenyl(COO(CH_2)_2S-(CH_2)_2OH)-N=N-$ indole(2-phenyl) | Do. |
| 8 | $O_2N-\phenyl(COO(CH_2)_2OCH_3)-N=N-$ indole(2-phenyl) | Do. |

EXAMPLE 9

24 parts of finely powdered 2-amino-4-nitrobenzoic β-methoxyethyl ester is stirred for several hours with 300 parts of water and 0.3 part of the reaction product of oleylamine with about twelve moles of ethylene oxide at room temperature. 25 parts by volume of concentrated hydrochloric acid and 300 parts of ice are added and 30 parts by volume of 23% sodium nitrite solution is allowed to flow in slowly. The whole is stirred at the same temperature for another two hours and any excess of nitrous acid is removed as usual. The product is filtered off and coupled with 20.3 parts of 2-phenylindole in a manner analogous to that described in Example 1. A yellow brown powder is formed which dissolves in acetone with a yellow coloration and produces golden yellow dyeings distinguished by excellent fastness properties on polyamide or polyethylene terephthalate.

The following dyes are obtained in analogous manner:

| Example Number: | | Shade of dyeing on polyethylene terephthalate |
|---|---|---|
| 10 | 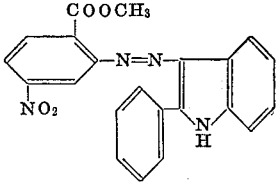 | Golden yellow. |
| 11 | 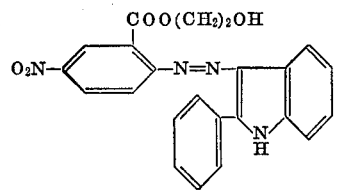 | Orange. |
| 12 | 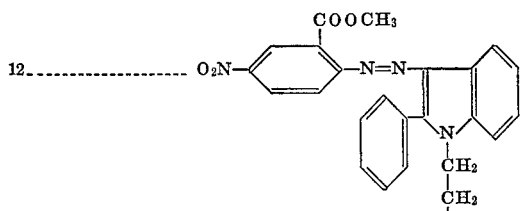 | Do. |
| 13 | 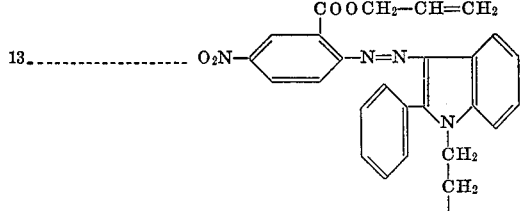 | Do. |
| 14 | 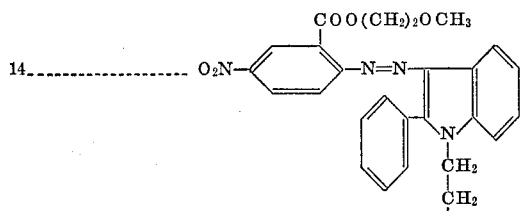 | Do. |
| 15 | 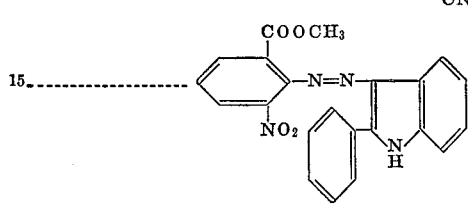 | Yellow. |

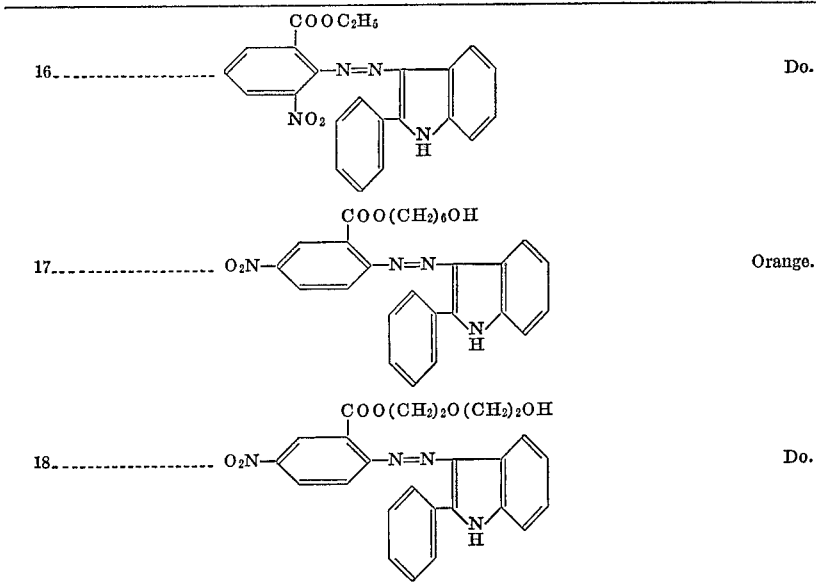

EXAMPLE 19

22.3 parts of the β-cyanoethyl ester of 2-amino-5-nitrobenzoic acid is dissolved in 300 parts by volume of dimethyl formamide and then 30 parts by volume of concentrated hydrochloric acid is added at 0° to 5° C. 30 parts by volume of 23% sodium nitrite solution is allowed to flow in slowly at the same temperature and the whole is stirred for two hours. Any excess of nitrous acid present is removed as usual and a pH value of 4 is set up by adding an aqueous solution of sodium acetate. The whole is filtered and the producted is coupled with 20.3 parts of 2-phenylindole analogous to Example 1. After the product has been worked up it is obtained as a brown powder, which dissolves in dimethyl formamide with an orange coloration and gives orange dyeings having very good fastness properties on polyethylene terephthalate cloth.

The following dyes are obtained in an analogous manner:

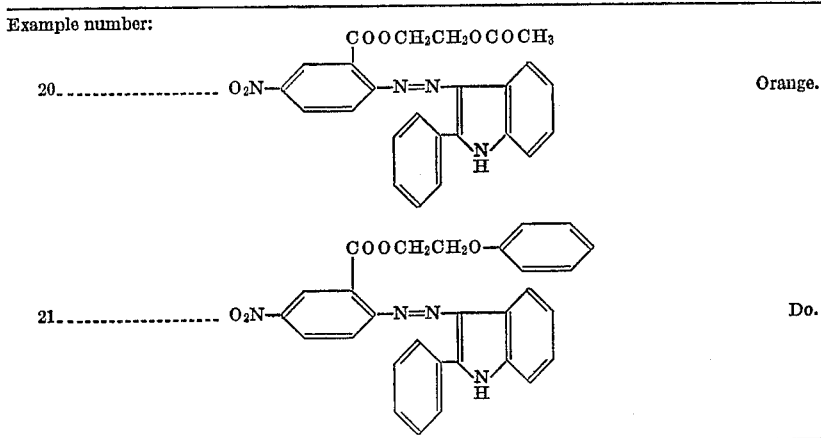

EXAMPLE 22

A solution of 28.4 parts of the [β-(β'-methoxy)-ethoxy]-ethyl ester of 2-amino-5-nitrobenzoic acid in 100 parts by volume of dimethyl formamide is added to a mixture of 300 parts of ice, 30 parts by volume of concentrated hydrochloric acid and 0.3 part of the reaction product of oleylamine with about 12 moles of ethylene oxide. The whole is stirred for four hours at a temperature of from 5° to 10° C., filtered and coupled with 20.3 parts of 2-phenylindole analogously to Example 1. A brown red powder is obtained which dissolves in acetone with an orange coloration and produces orange dyeings having excellent fastness to light and heat setting on polyethylene terephthalate cloth.

The dyes in the following table may be obtained in an analogous manner:

| Example number: | Structure | Shade of dyeing on polyethylene terephthalate |
|---|---|---|
| 23 | $O_2N$—⟨ ⟩—$COO(CH_2)_2O(CH_2)_2OC_2H_5$ ; —N=N—indole(2-phenyl, NH) | Orange. |
| 24 | $O_2N$—⟨ ⟩—$COO(CH_2)_2O(CH_2)_2O(CH_2)_2OCH_3$ ; —N=N—indole(2-phenyl, NH) | Do. |
| 25 | $O_2N$—⟨ ⟩—$COO$—$C_6H_{11}$ ; —N=N—indole(2-phenyl, NH) | Do. |
| 26 | $O_2N$—⟨ ⟩—$COOCH_2CH_2OC_2H_5$ ; —N=N—indole(2-phenyl, N-$CH_2CH_2CN$) | Do. |
| 27 | ⟨ ⟩($NO_2$)—$COOCH_2CH_2OC_2H_5$ ; —N=N—indole(2-phenyl, NH) | Golden yellow. |
| 28 | ⟨ ⟩($NO_2$)—$COO(CH_2)_2O(CH_2)_2OCH_3$ ; —N=N—indole(2-phenyl, NH) | Do. |
| 29 | ⟨ ⟩($O_2N$, $COOCH_3$)—N=N—indole(2-phenyl, NH) | Yellow. |

We claim:
1. A monoazo dye devoid of sulfonic acid groups and having the formula:

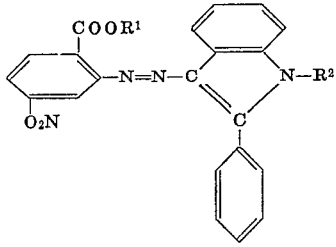

in which R¹ denotes a member selected from the class consisting of alkyl of 1 to 4 carbon atoms, hydroxyalkyl of 2 to 6 carbon atoms, allyl, cyanoethyl, cyclohexyl, benzyl, phenylethyl, phenoxyethyl, alkanoyloxyalkyl in which the alkanoyl and alkyl radicals are each of 2 to 3 carbon atoms, and the substituents of the formulae

X being hydrogen or alkyl of 1 to 4 carbon atoms, $m$ being one of the integers from 1 to 3, and in which R² denotes a member selected from the class consisting of hydrogen methyl and cyanoethyl.

2. A monoazo dye devoid of sulfonic acid groups and having the formula:

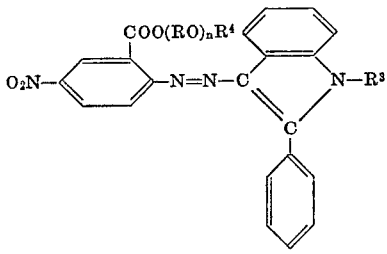

or

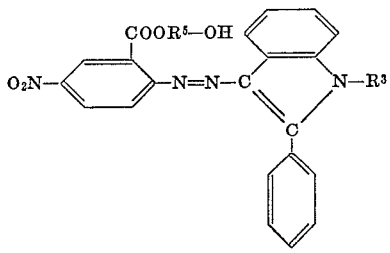

in which R denotes alkylene of two to three carbon atoms, R⁴ denotes a member selected from the class consisting of hydrogen, alkyl of one to four carbon atoms, acetyl and propionyl, R⁵ denotes alkylene of four to ten carbon atoms, $n$ denotes one of the integers from 1 to 3 and R³ denotes a member selected from the class consisting of hydrogen, methyl and cyanoethyl.

References Cited

FOREIGN PATENTS 1,361,694   4/1964   France _____ 260—165

CHARLES B. PARKER, Primary Examiner

D. M. PAPUGA, Assistant Examiner

U.S. Cl. X.R.

260—319.1; 8—41, 55